United States Patent
Anson et al.

(10) Patent No.: US 7,284,278 B2
(45) Date of Patent: Oct. 16, 2007

(54) SECURED KVM SWITCH

(75) Inventors: Douglas M. Anson, Dripping Springs, TX (US); James C. Lowery, Austin, TX (US); Frank H. Molsberry, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 505 days.

(21) Appl. No.: 10/379,193

(22) Filed: Mar. 4, 2003

(65) Prior Publication Data

US 2004/0177264 A1    Sep. 9, 2004

(51) Int. Cl.
*H01H 13/70* (2006.01)

(52) U.S. Cl. .............................. 726/34; 710/1; 710/62; 345/156; 345/168; 703/24; 703/25

(58) Field of Classification Search .................... 726/34
See application file for complete search history.

(56) References Cited

U.S. PATENT DOCUMENTS

| | | | |
|---|---|---|---|
| 5,884,096 A | 3/1999 | Beasley et al. ............. 395/858 |
| 6,256,014 B1 | 7/2001 | Thomas et al. ............. 345/163 |
| 6,304,895 B1 | 10/2001 | Schneider et al. .......... 709/203 |
| 6,324,605 B1 | 11/2001 | Rafferty et al. ............. 710/100 |
| 6,378,009 B1 | 4/2002 | Pinkston, II et al. ......... 710/62 |
| 6,378,014 B1 | 4/2002 | Shirley ....................... 710/100 |
| 6,388,658 B1 | 5/2002 | Ahern et al. ................. 345/168 |
| 6,643,701 B1 * | 11/2003 | Aziz et al. ................... 709/227 |
| 6,681,250 B1 * | 1/2004 | Thomas et al. ............. 709/226 |
| 2002/0116539 A1 * | 8/2002 | Bryczkowski et al. ...... 709/317 |

OTHER PUBLICATIONS

Webopedia.com, IPsec, Jan. 29, 2002□□ Archive.org Wayback machine page from Aug. 8, 2002□□ http://web.archive.org/web/20020808073705/http://www.webopedia.com/TERM/I/IPsec.html.*

* cited by examiner

*Primary Examiner*—Emmanuel L. Moise
*Assistant Examiner*—David J. Pearson
(74) *Attorney, Agent, or Firm*—Baker Botts L.L.P.

(57) ABSTRACT

A method supports secure input/output (I/O) communications between an I/O device and a data processing system via a keyboard, video, and mouse (KVM) switch. An example embodiment includes the operations of establishing a first secure communication channel between the KVM switch and the I/O device and establishing a second secure communication channel between the KVM switch and the data processing system. In addition, I/O data may be received at the KVM switch from the I/O device via the first secure communication channel. In response to receipt of the I/O data from the I/O device, the I/O data may be transmitted from the KVM switch to the data processing system via the second secure communication channel. Embodiments may also include support for non-secure channels between the KVM switch and non-secured I/O devices, non-secured data processing systems, or both.

20 Claims, 2 Drawing Sheets

SECURED KVM SWITCH

TECHNICAL FIELD

The present invention relates in general to information handling systems. In particular, the present invention relates to systems and methods for supporting secure communications between data processing systems and input/output (I/O) devices such as keyboards, mice, and video displays.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For instance, an information handling system may include multiple, interconnected data processing systems, such as personal computers, rack servers, blade servers, etc. Such an information handling system may be referred to as a collocated computer installation. An apparatus known in general as a keyboard, video, and mouse (KVM) switch may be used to manage the data processing systems within a conventional collocated computer installation. For instance, a KVM switch may be used to selectively link a single set of input/output (I/O) devices (e.g., a keyboard, a mouse, and a display device) to a desired data processing system within the collocated computer installation.

In a conventional data processing system, the communications between the components on the motherboard and the attached peripheral devices are not secured. Likewise, in a conventional collocated computer installation, the communications between the I/O devices and the data processing systems are not secured.

SUMMARY

This document discloses a system and method for supporting secure I/O communications in an information handling system such as a collocated computer installation. For instance, a KVM switch according to the present disclosure supports secure I/O communications between I/O devices and selected data processing systems. Similarly, an example method for supporting secure I/O communications in a collocated computer installation is disclosed.

As described in greater detail below, the method may involve the operations of establishing a first secure communication channel between the KVM switch and an I/O device and establishing a second secure communication channel between the KVM switch and a data processing system. I/O data may be received at the KVM switch from the I/O device via the first secure communication channel. In response to receipt of the I/O data from the I/O device, the I/O data may be transmitted from the KVM switch to the data processing system via the second secure communication channel.

Embodiments may also include support for non-secure channels between the KVM switch and non-secured I/O devices, non-secured data processing systems, or both.

BRIEF DESCRIPTION OF THE DRAWINGS

The present invention and numerous advantages, objects, and features of various alternative embodiments may be better understood by reference to the following description of one or more example embodiments, and the accompanying drawings, in which.

DETAILED DESCRIPTION

Figure 1:
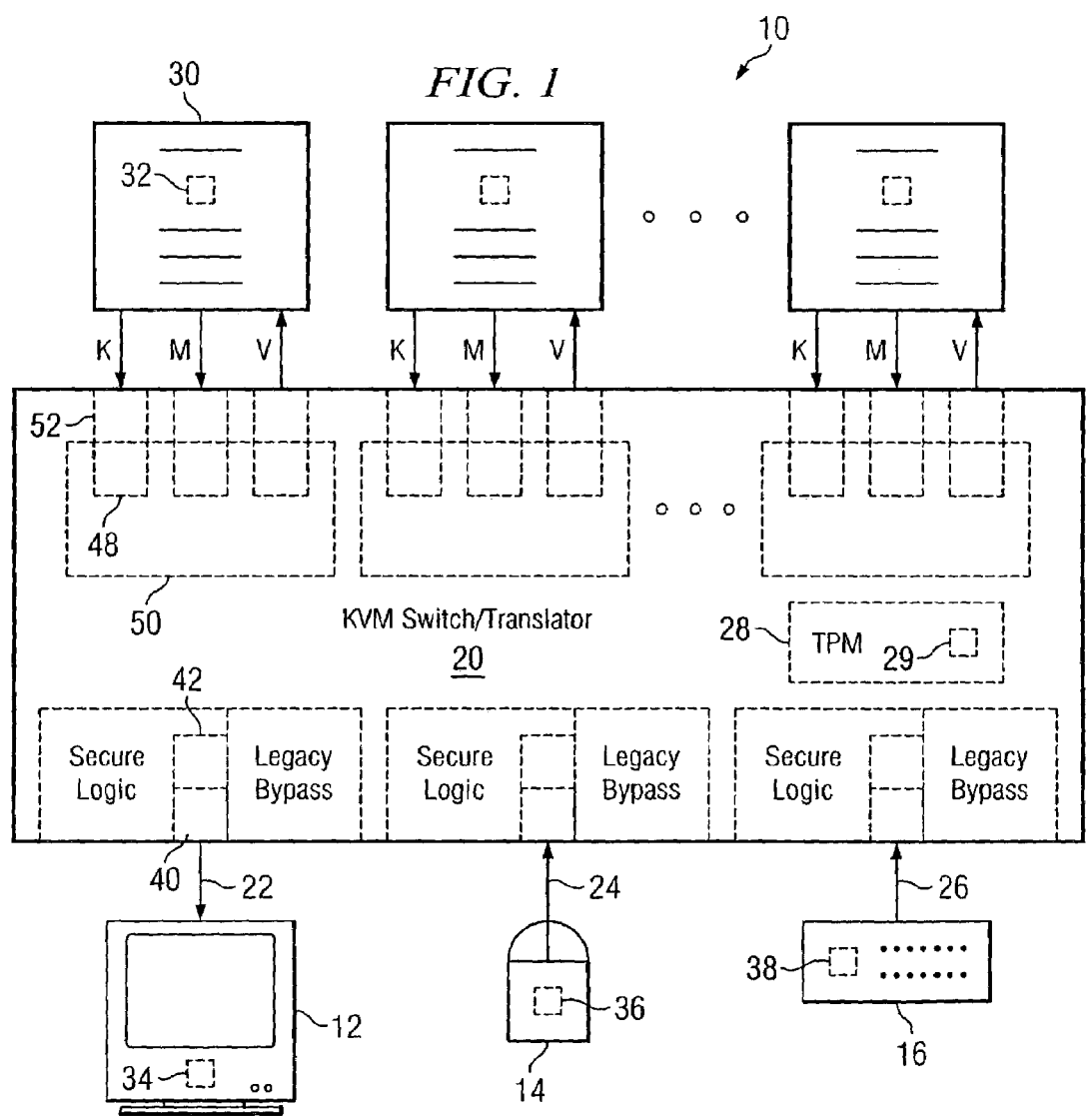
FIG. 1 depicts a block diagram of an example embodiment of a collocated computer installation that supports secure communications between data processing systems and I/O devices according to the present invention.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

As mentioned above, conventional data processing systems and conventional collocated computer installations do not support secure communications between peripheral components and associated data processing systems. Recently, however, increasing concerns about security have led to the development of standards for trusted systems.

To support a stronger data security model, standards for trusted systems call for the evolution of computer architectures to tightly integrate encryption technology with hardware components. This trend is generally known as a move toward secured computing. One aspect of the secured computing model is the creation of encrypted communication sessions between a computer system and its peripheral devices. Corresponding to the trend toward secured computing is the development of what are referred to herein as "secured computers" and "secured peripherals."

For purposes of this disclosure, a secured computer includes one or more processors and a motherboard with imbedded security resources for establishing secure communication channels, or otherwise implementing secure data transfers, between components on the motherboard and peripheral devices. A secured computer may also be referred to as a secured data processing system.

Secured peripherals may include technologies such as secured data storage components and secured I/O devices. For purposes of this disclosure, a secured I/O device is an apparatus for receiving user input or providing user output, where the apparatus includes security resources for establishing a secure communication channel, or otherwise implementing secure data transfers, between the apparatus and a data processing system with which the apparatus is communicating. For example, keyboards, pointing devices such as mice, and output devices such as video monitors may be implemented as secured I/O devices.

The security resources in a secured data processing system or a secured I/O device may include, for example, security-centric control logic, hardware components such as processing hardware, and persona information. For instance, the security resources may be implemented, in whole or in part, as a trusted platform module (TPM), as defined by the Trusted Computing Platform Alliance (www.tcpa.org). The TPM may implement encrypted data transfers between the computer system and the secured external devices.

Communications over each secure communication channel are encrypted according to negotiations conducted during creation of the secure connection between the I/O device and the data processing system. Each secure communication channel provides for an encrypted communication session, between the data processing system and the attached peripheral.

After a secure communication channel between a secured I/O device and a secured data processing system has been established, if that channel is broken, the security resources in the data processing system notify the data processing system that security has been compromised, so that the data processing system may take appropriate measures, such as disregarding any subsequent input from the secured I/O device, for example.

KVM switches have been found useful for administering non-secured collocated computer installations. However, if one were to configure a collocated computer installation to include secured I/O devices or secured data processing systems, a conventional KVM switch would not work with that collocated computer installation.

For example, a secured keyboard device, in order to communicate with a secured data processing system, must incorporate additional logic for negotiating a secure connection between itself and the data processing system upon boot, and for maintaining this association until power-off or re-boot. The integrity of the connection requires that it not be broken during this time. Furthermore, the keyboard that initiated the connection at boot time must remain attached to the data processing system at all times, and only that keyboard will be recognized as valid by the data processing system. Therefore, the architecture implies one secured keyboard to one secured data processing system. Other secured I/O devices, such as a secured mouse and a secured video device, may operate in a similar manner. Also, encryption for analog video display signals or other techniques for providing secure video data communications may be used.

One architectural element noticeably missing from the secured computing model is support for one-to-many relationships as implemented by a KVM switch. Insertion of a conventional KVM switch between a group of secured data processing systems and a single secured keyboard, mouse, and/or monitor is problematic, as conventional KVM designs do not incorporate the required logic to meet the boot-time and ongoing connection requirements. Even if one were to carefully configure a conventional KVM switch prior to boot so that a secured I/O device is connected to a secured data processing system, any operation of the KVM switch that switches the connection of the I/O device to a different data processing system would necessarily disconnect the I/O device from the original data processing system, destroying the previously negotiated secure communication channel.

By contrast, as described in greater detail below, a KVM switch according to the present disclosure may also include security resources to support I/O communications in a collocated computer installation with secured data processing systems, secured I/O devices, or both.

Referring now to FIG. 1, a secured KVM switch 20 according to the present disclosure supports secure communications between I/O devices such as a keyboard 16, a mouse 14, and a display 12, in a collocated computer installation 10 including multiple data processing systems 30. In the illustrated embodiment, the I/O devices include security resources such as TPMs 34, 36, and 38. Similarly, each data processing system 30 includes a TPM 32, or other security resources for implementing secured computing.

In addition, KVM switch 20 includes a TPM 28, and/or other security resources, for supporting secured computing in collocated computer installations. For instance, the security resources may be implemented in whole or in part as one or more hardened security chips that provide virtual secured I/O devices 48 for each attached secured data processing system 30, as well as a virtual secured data processing system 42 for each attached secured I/O device.

For example, the security resources may provide a virtual KVM 50 that emulates a virtual secured keyboard, a virtual secured mouse, and a virtual secured video display. In the example embodiment, each virtual KVM 50 provides complete emulation of one or more devices, such that each emulated device 48 is indistinguishable from a physical device to the data processing system to which it is connected via a system port 52. Likewise, secure logic provided in connection with a peripheral port 40 for each I/O device provides complete emulation of a secured data processing system, such that the emulated data processing system 42 is indistinguishable from a physical data processing system to the I/O device connected to the peripheral port 40. Thus, unlike traditional KVM switches, KVM switch 20 serves multiple roles in collocated computer installation 10, including roles for emulating secured data processing systems for constant connections to secured I/O devices, in addition to roles for emulating secured I/O devices for constant connections to secured data processing systems.

FIGS. 2 through 5 depict example embodiments of processes for supporting secure communications between data processing systems and I/O devices. Such a method may be used, for example, within collocated computer installation 10 of FIG. 1.

Figure 2:
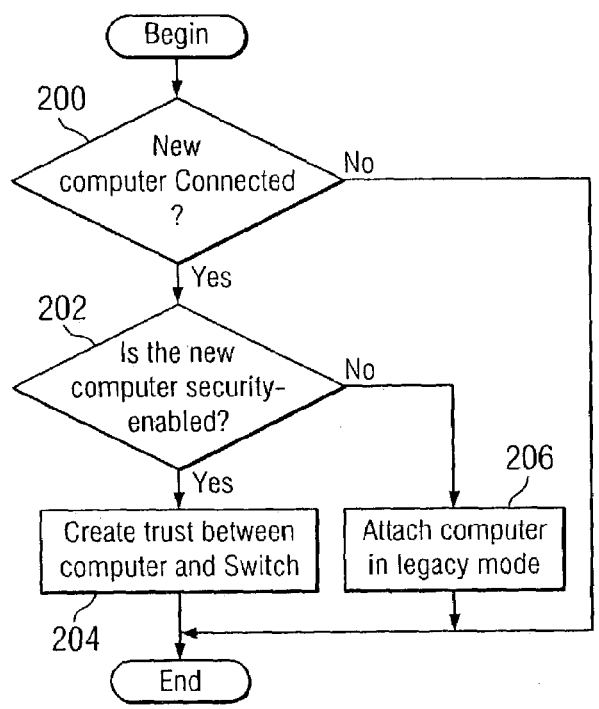
FIGS. 2 through 5 depict flowcharts of example embodiments of processes for supporting secure communications between data processing systems and I/O devices according to the present invention.

In particular, FIG. 2 depicts an example embodiment of a process for establishing a connection between KVM switch 20 and a computer. The disclosed process may begin with KVM switch 20 having one or more open system ports 48. At step 200, KVM switch 20 may detect that a connection has been formed between a data processing system 30 and KVM switch 20. Upon detecting the new data processing system 30, KVM switch 20 may determine whether the new data processing system is security enabled, as indicated at block 202. As indicated at block 204, if the new data processing system is security enabled, KVM switch 20 and the new data processing system may negotiate to establish a trust relationship and, upon successful negotiation of the trust relationship, may establish a secure session for communication between that data processing system and KVM switch 20. Otherwise, as depicted at block 206, KVM switch may attach the new computer in legacy mode.

Figure 3:
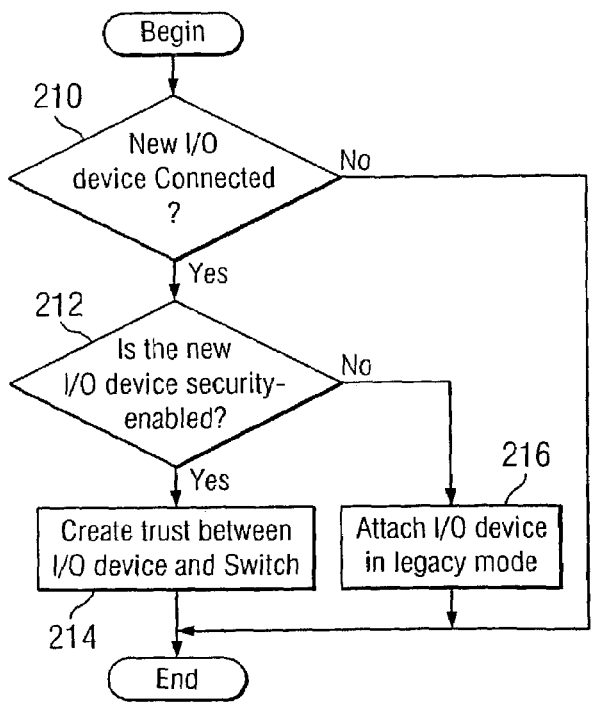

FIG. 3 depicts an example embodiment of a process for establishing a connection between KVM switch 20 and a new I/O device. That process may begin with KVM switch 20 monitoring one or more open peripheral ports 40 to detect when a new I/O device has been connected. At block 210, KVM switch 20 may detect that a connection has been formed between an I/O device and KVM switch 20. Upon detecting the new I/O device, KVM switch 20 may determine whether the new I/O device is security enabled, as indicated at block 212. If the new I/O device is security enabled, KVM switch 20 and the new I/O device may negotiate to establish a trust relationship and a secure session between that I/O device and KVM switch 20, as indicated at block 214. Otherwise, as depicted at block 216, KVM switch may attach the new I/O device in legacy mode.

Any suitable method may be used by the I/O devices, data processing systems 30, and KVM switch 20 to establish secure communication channels. For instance, in one implementation, the secured communication channels may use cryptography technologies, such as public-key infrastructure (PKI) computing and key storage. KVM switch 20 may exchange keys and persona data from a keystore 29 in TPM 28 with the new data processing system 30, for example. Similarly, TPMs 34, 38, and 38 in the I/O devices and TPM 32 in each data processing system 30 may include keystores and persona data that are used to establish secure communication channels. Other secure communication techniques may be used in other implementations.

Referring again to blocks 204 and 214 in FIGS. 2 and 3, during authentication, user input may be requested for confirmation of the trust relationship before completion of the process for establishing the secure communication channel. Upon proper authentication, KVM switch 20 and the new data processing system 30 or I/O device may recognize that a trust relationship has been established and complete the secure communication channel.

In the example embodiment, KVM switch 20 may support physical selection mechanisms, logical selection mechanisms, or both, for a user to link I/O devices to a selected data processing system 30. The user input may be referred to as a control command or a switch command, and that input may be received, for example, as a result of physical manipulation of KVM switch 20 or from an electronic interface to another device, such as a management workstation.

Figure 4:
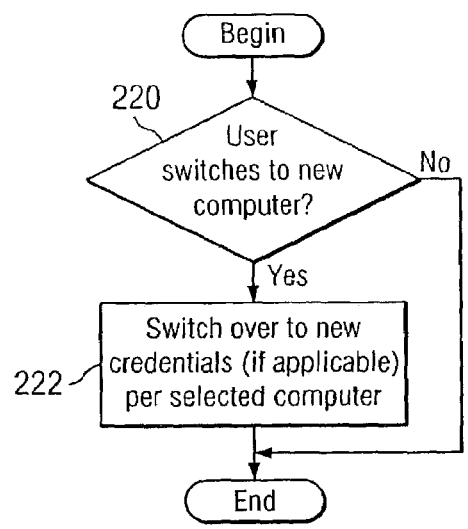

FIG. 4 depicts an example embodiment of a process for using KVM switch 20 to select a different computer for I/O. The process may begin with KVM switch 20 providing I/O to and from one computer. At block 220, KVM switch 20 may receive a switch command requesting I/O with a different computer. Such a command may be referred to as a command to switch the active link or links. In response to the switch command, KVM switch may switch over to new credentials, if applicable, for the selected computer, as indicated at block 222. For instance, when a switch command is received, KVM switch 20 may respond by updating its internal configuration to provide for communication between the selected I/O devices and the selected data processing system 30.

As described in greater detail below, the physical devices may be secured devices or legacy devices. If the former, then a separate secured connection will already exist between the physical device and the secured KVM switch, as described above. In this case, KVM switch 20 itself and the attached device or devices (e.g., secured keyboard, mouse, and display) form a secured system.

Figure 5:
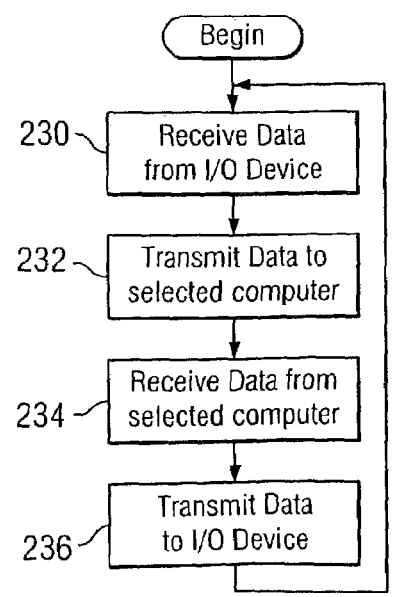

FIG. 5 depicts an example embodiment of a process for supporting communications between I/O devices and a selected computer. The process may begin with KVM switch 20 monitoring ports for components on both ends of an active link, such as I/O devices and a selected computer, for data. At block 230, KVM switch 20 may receive data from one of those I/O devices. In response, KVM switch 20 may transmit that data to the selected computer, as shown at block 232. At block 234, KVM switch 20 may receive data from the selected computer. In response, KVM switch 20 may transmit that data to the corresponding I/O device, as depicted at block 236.

When KVM switch 20 sends and receives data to and from a computer and an I/O device, if the I/O device is a secured I/O device, a secured communication channel will have been established between KVM switch 20 and that device, and the data traveling by that channel will therefore be secured, for instance, by encryption. Likewise, if the selected data processing system 30 is a secured data processing system, a secure communication channel will already have been established between KVM switch 20 and that data processing system 30.

KVM switch 20 may receive encrypted communications from the I/O device at one port 40, decrypt the received data, forward the decrypted data to a virtual KVM 50 for the linked data processing system 30, and encrypt the data for transmission to the linked data processing system 30. KVM switch 20 may also receive data from the selected data processing system 30 and forward that data to the selected I/O device using secure communication channels as appropriate. For instance, KVM switch 20 may receive encrypted communications from a data processing system 30, decrypt the received data, forward the decrypted data to a virtual data processing system 42 for one of the linked I/O devices, and encrypt the data for transmission to that I/O device. Accordingly, KVM switch 20 provides secure communications between secured I/O devices and secured data processing systems.

As described above, KVM switch 20 maintains secure channels to each secured data processing system and to each secured I/O device, whether or not a particular data processing system or I/O device is currently linked through KVM switch as an active device for I/O communications. If an I/O device or data processing system 30 is subsequently disconnected, either physically or through a re-boot, KVM switch 20 will recognize that the trust relationship with that device has been broken.

Any trust relationship within KVM switch 20 that is broken will require a new renegotiation handshake to recreate that trust upon reconnection. Effectively any disconnection ends the existing relationship and a new trust relationship must be formed.

In the illustrated embodiment of collocated computer installation 10, the I/O devices are secured I/O devices and data processing systems 30 are secured data processing systems. However, in the illustrated embodiment, KVM switch 20 supports both secured and non-secured (legacy) systems, as well as either secured or legacy keyboards, pointing devices, and display devices. For example, in alternative collocated computer installations, one or more of the I/O devices may be non-secured peripherals and one or more of the data processing systems 30 may be non-secured data processing systems. According to the disclosed embodiment of KVM switch 20, legacy components, such as non-secure computers and I/O devices, may be supported as a configurable option on a per-KVM-port basis.

If an attached data processing system and an attached I/O device are not secured devices, then KVM switch 20 may provide a non-secured communication channel between those components. For instance, peripheral ports 40 may include components such as a legacy bypass for communicating with legacy devices. Similarly, the system ports 52 associated with virtual KVMs 50 may include legacy bypasses for communicating with legacy data processing systems. In the example embodiment, KVM switch 20 supports any combination of secured and non-secured peripherals and data processing systems. For example, in a collocated computer installation with a secured keyboard and a legacy data processing system, the KVM switch may receive encrypted I/O data from the keyboard and, in response, transmit decrypted I/O data to the data processing system.

Although the present invention has been described with reference to various example embodiments, those with ordinary skill in the art will understand that numerous variations of those embodiments could be practiced without departing from the scope and spirit of the present invention. For example, one of ordinary skill will appreciate that alternative embodiments could be deployed with many variations in the number and type of data processing systems and other components in the collocated computer installation and with many variations in myriad other details without departing from the present invention.

It should also be noted that the hardware and software components depicted in the example embodiment represent functional elements that are reasonably self-contained so that each can be designed, constructed, or updated substantially independently of the others. In alternative embodiments, however, it should be understood that the components may be implemented as hardware, software, or combinations of hardware and software for providing the functionality described and illustrated herein.

Alternative embodiments of the invention may also include computer-usable media encoding logic such as computer instructions for performing the operations of the invention. Such computer-usable media may include, without limitation, storage media such as floppy disks, hard disks, CD-ROMS, read-only memory, and random access memory; as well as communications media such as wires, optical fibers, microwaves, radio waves, and other electromagnetic or optical carriers. The control logic may also be referred to as a program product.

Many other aspects of the example embodiment may also be changed in alternative embodiments without departing from the scope and spirit of the invention. The scope of the invention is therefore not limited to the particulars of the embodiments or implementations illustrated herein, but is defined by the appended claims.

What is claimed is:

1. A method for supporting secure input/output (I/O) communications between a plurality of I/O devices and a plurality of data processing systems via a keyboard, video, and mouse (KVM) switch, the method comprising:
    the KVM switch providing, for each of the data processing systems, a plurality of emulated virtual secured I/O devices such that to the data processing system, the emulated virtual secured I/O devices are indistinguishable from physical I/O devices;
    the KVM switch providing, for each of the I/O devices, an emulated virtual secured data processing system such that to the I/O device, the emulated virtual secured data processing system is indistinguishable from a physical data processing system;
    establishing a first secure communication channel between a first one of the I/O devices and the emulated virtual secured data processing system provided for the first I/O device, wherein the first I/O device is selected from a group consisting of a keyboard, a video device, and a computer mouse;
    establishing a second secure communication channel between a first one of the data processing systems and a particular one of the emulated virtual secured I/O devices provided for the first data processing system;
    wherein at least one of the first and second secure communication channels supports encrypted communications;
    transmitting I/O data between the KVM switch and the first I/O device via the first secure communication channel; and
    transmitting the I/O data between the KVM switch and the first data processing system via the second secure communication channel;
    wherein at least one of the transmissions of the I/O data comprises a transmission of encrypted I/O data via the first or second secure communication channel.

2. The method of claim 1, wherein the data processing system comprises a first data processing system, the method further comprising:
    establishing a third secure communication channel between the KVM switch and a second data processing system;
    receiving a control command to switch from the first data processing system to the second data processing system;
    after receiving the control command, receiving subsequent I/O data at the KVM switch from the first I/O device via the first secure communication channel; and
    in response to receiving the subsequent I/O data from the first I/O device at the KVM switch via the first secure communication channel, transmitting the subsequent I/O data from the KVM switch to the second data processing system via the third secure communication channel.

3. The method of claim 1, wherein the I/O data transmitted via the first secure communication channel comprises encrypted I/O data.

4. The method of claim 1, wherein the I/O data transmitted via the second secure communication channel comprises encrypted I/O.

5. The method of claim 1, wherein establishing a first secure communication channel between the first I/O device and the emulated virtual secured data processing system provided for the first I/O device comprises exchanging persona information between the first I/O device and the emulated virtual secured data processing system.

6. The method of claim 1, wherein establishing a second secure communication channel between the first data processing system and the particular emulated virtual secured I/O device comprises passing a key between the first data processing system and the particular emulated virtual secured I/O device.

7. The method of claim 1, wherein establishing a first secure communication channel between the first I/O device and the emulated virtual secured data processing system provided for the first I/O device comprises passing a key between first I/O device and the emulated virtual secured data processing system.

8. The method of claim 7, further comprising storing the key in a keystore in a security chip in the KVM switch.

9. The method of claim 1, wherein transmitting the I/O data between the KVM switch and the first data processing system comprises transmitting decrypted I/O data between the KVM switch and the first data processing system.

10. A keyboard, video, and mouse (KVM) switch that supports secure input/output (I/O) communications between an I/O device in communication with the KVM switch and a data processing system in communication with the KVM switch, the KVM switch comprising:

a peripheral port operable to communicate with the I/O device wherein the I/O device is selected from the group consisting of a keyboard, a video device, and a computer mouse;

a system port operable to communicate with the data processing system;

security logic in the KVM switch that provides an emulated virtual secured data processing system for the I/O device such that to the I/O device, the emulated virtual secured data processing system is indistinguishable from a physical data processing system, the security logic establishing a first secure communication channel between the emulated virtual secured data processing system and the I/O device via the peripheral port;

virtual KVM logic in the KVM switch that provides a plurality of emulated virtual secured I/O devices for the data processing system such that to the data processing system, the emulated virtual secured I/O devices are indistinguishable from physical I/O devices, the virtual KVM logic establishing a second secure communication channel between one of the emulated virtual secured I/O devices and the data processing system via the system port; and switching logic that, in response to receiving I/O data from one of the I/O device via the first secure communication channel and the data processing system via the second secure communication channel, subsequently transmits the I/O data from the KVM switch to the other of the I/O device via the first secure communication channel and the data processing system via the second secure communication channel;

wherein the KVM switch receives the I/O data via the first or second secure communication channel as encrypted I/O data, or transmits the I/O data via the first or second secure communication channel as encrypted I/O data, or both.

11. The KVM switch of claim 10, wherein:

the system port comprises a first system port;

the KVM switch further comprises a second system port;

the virtual KVM logic establishes a third secure communication channel between the KVM switch and a second data processing system in communication with the KVM switch via the second system port; and in response to receiving a control command to switch from the first data processing system to the second data processing system and then receiving subsequent I/O data from the I/O device, the KVM switch transmits the subsequent I/O data to the second data processing system via the third secure communication channel.

12. The KVM switch of claim 10, wherein the KVM switch receives the I/O data from the I/O device as encrypted I/O data.

13. The KVM switch of claim 10, wherein the KVM switch transmits the I/O data to the data processing system as encrypted I/O data.

14. The KVM switch of claim 10, wherein the KVM switch establishes the first secure communication channel between the emulated virtual secured data processing system and the I/O device in response to receiving a key from the I/O device.

15. The KVM switch of claim 10, further comprising:

a security chip that contains the security logic and the virtual KVM logic; and a keystore in the security chip used to establish the first secure communication channel.

16. The KVM switch of claim 10, wherein the virtual KVM logic in the KVM switch establishes the second secure communication channel between the between the emulated virtual secured I/O device and the data processing system in response to receiving a key from the data processing system.

17. The KVM switch of claim 10, wherein the KVM switch also supports a non-secure channel between the KVM switch and a non-secured data processing system.

18. The KVM switch of claim 10, wherein the KVM switch also supports a non-secure channel between the KVM switch and a non-secured I/O device.

19. An information handling system that supports secure input/output (I/O) communications between an I/O device and a data processing system via a keyboard, video, and mouse (KVM) switch, the information handling system comprising:

a data processing system;

an input/output (I/O) device; and a keyboard, video, and mouse (KVM) switch in communication with the data processing system and the I/O device wherein the I/O device is selected from the group consisting of a keyboard, a video device, and a computer mouse;

security logic in the KVM switch that provides an emulated virtual secured data processing system for the I/O device such that to the I/O device, the emulated virtual secured data processing system is indistinguishable from a physical data processing system, the security logic establishing a first secure communication channel between the emulated virtual secured data processing system and the I/O device;

virtual KVM logic in the KVM switch that provides a plurality of emulated virtual secured I/O devices for the data processing system such that to the data processing system, the emulated virtual secured I/O devices are indistinguishable from physical I/O devices, the virtual KVM logic establishing a second secure communication channel between one of the emulated virtual secured I/O devices and the data processing system; and switching logic that, in response to receiving I/O data from the I/O device via the first secure communication channel, transmits the I/O data from the KVM switch to the data processing system via the second secure communication channel;

wherein the I/O data is received via the first secure communication channel as encrypted I/O data, or transmitted via the second secure communication channel as encrypted I/O data, or both.

20. The information handling system of claim 19, wherein the KVM switch provides a secured, virtual I/O device for the data processing system by maintaining the secure communication channel between the data processing system and the KVM switch despite switching of the I/O device to a different data processing system in communication with the KVM switch.

* * * * *